(12) United States Patent
Wagner et al.

(10) Patent No.: US 7,581,111 B2
(45) Date of Patent: Aug. 25, 2009

(54) SYSTEM, METHOD AND APPARATUS FOR TRANSPARENTLY GRANTING ACCESS TO A SELECTED DEVICE USING AN AUTOMATICALLY GENERATED CREDENTIAL

(75) Inventors: Matthew J. Wagner, Cypress, TX (US); Valiuddin Ali, Houston, TX (US); Manuel Novoa, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 910 days.

(21) Appl. No.: 10/780,397

(22) Filed: Feb. 17, 2004

(65) Prior Publication Data
US 2005/0182944 A1 Aug. 18, 2005

(51) Int. Cl.
*G06F 21/00* (2006.01)
(52) U.S. Cl. .......... 713/182; 713/168; 726/4; 726/16
(58) Field of Classification Search .......... 726/16, 726/4; 713/182, 168
See application file for complete search history.

(56) References Cited

U.S. PATENT DOCUMENTS

| | | | | |
|---|---|---|---|---|
| 4,800,590 A * | 1/1989 | Vaughan | | 713/184 |
| 5,768,503 A * | 6/1998 | Olkin | | 726/5 |
| 6,240,512 B1 * | 5/2001 | Fang et al. | | 713/150 |
| 6,401,208 B2 | 6/2002 | Davis et al. | | |
| 6,405,315 B1 | 6/2002 | Burns et al. | | |
| 6,546,489 B1 | 4/2003 | Frank, Jr. et al. | | |
| 6,615,353 B1 * | 9/2003 | Hashiguchi | | 713/185 |
| 6,618,810 B1 | 9/2003 | Dirie | | |
| 6,625,730 B1 | 9/2003 | Angelo et al. | | |
| 6,636,973 B1 | 10/2003 | Novoa et al. | | |
| 6,973,671 B1 * | 12/2005 | Hsing et al. | | 726/8 |
| 6,988,210 B1 * | 1/2006 | Audebert | | 726/9 |
| 7,020,645 B2 * | 3/2006 | Bisbee et al. | | 707/1 |
| 7,039,713 B1 * | 5/2006 | Van Gunter et al. | | 709/229 |
| 7,047,560 B2 * | 5/2006 | Fishman et al. | | 726/6 |
| 7,137,006 B1 * | 11/2006 | Grandcolas et al. | | 713/180 |
| 7,150,038 B1 * | 12/2006 | Samar | | 726/8 |
| 7,260,838 B2 * | 8/2007 | Bones et al. | | 726/8 |
| 7,426,530 B1 * | 9/2008 | Rosko et al. | | 709/201 |
| 7,502,933 B2 * | 3/2009 | Jakobsson et al. | | 713/172 |
| 2002/0002654 A1 | 1/2002 | Tomohiro | | |
| 2003/0182551 A1 * | 9/2003 | Frantz et al. | | 713/170 |

(Continued)

FOREIGN PATENT DOCUMENTS

JP 07-044330 A 2/1995

(Continued)

OTHER PUBLICATIONS

International Search Report dated Jun. 20, 2005.

(Continued)

*Primary Examiner*—Thomas Lee
*Assistant Examiner*—Jaweed A Abbaszadeh (57) ABSTRACT

A computer security system comprises a self-managed device having an authentication system for controlling access to the self-managed device by a user. The system also comprises a security module adapted to authenticate an identity of the user and, in response to user authentication, automatically generate, transparently to the user, device credential data verifiable by the authentication system to enable user access to the self-managed device.

46 Claims, 3 Drawing Sheets

U.S. PATENT DOCUMENTS

| | | | | |
|---|---|---|---|---|
| 2003/0226036 | A1* | 12/2003 | Bivens et al. | 713/201 |
| 2003/0226040 | A1 | 12/2003 | Challener et al. | |
| 2004/0123127 | A1 | 6/2004 | Teicher et al. | |
| 2004/0172535 | A1* | 9/2004 | Jakobsson et al. | 713/168 |
| 2004/0193882 | A1* | 9/2004 | Singerle, Jr. | 713/168 |
| 2004/0199795 | A1* | 10/2004 | Grewal et al. | 713/202 |
| 2004/0225709 | A1* | 11/2004 | Kubler et al. | 709/200 |
| 2005/0005094 | A1* | 1/2005 | Jamieson et al. | 713/155 |
| 2005/0015490 | A1* | 1/2005 | Saare et al. | 709/225 |
| 2005/0044402 | A1* | 2/2005 | Libin et al. | 713/200 |
| 2005/0091213 | A1* | 4/2005 | Schutz et al. | 707/9 |
| 2005/0125698 | A1* | 6/2005 | Yeates et al. | 713/202 |
| 2005/0177730 | A1* | 8/2005 | Davenport et al. | 713/182 |
| 2005/0240775 | A1* | 10/2005 | Chan | 713/182 |
| 2006/0031592 | A1* | 2/2006 | Hinton et al. | 709/250 |
| 2006/0156026 | A1* | 7/2006 | Utin | 713/183 |

FOREIGN PATENT DOCUMENTS

| | | |
|---|---|---|
| JP | 10-143443 | 5/1998 |
| JP | 11-353049 A | 12/1999 |
| JP | 2002-169782 | 6/2002 |
| JP | 2002-007216 | 11/2002 |
| JP | 2003-084849 | 3/2003 |
| WO | WO 03/003242 | 1/2003 |

OTHER PUBLICATIONS

European Examination Report dated Feb. 14, 2008.
Translated Office Action from Japan Patent Examination Office, Takahashi, Katsu. Mar. 13, 2009.
Patent Office-Japan, Office Action dated Oct. 7, 2008, for Application No. JP-2005-035582; pp. 1-4 (translation), pp. 1-3 (original).
Dei Hajime, Figaro's Password Manager, Linux Magazine, Japan, ASCII Corporation, Aug. 1, 2000, vol. 2, No. 8, pp. 161.

* cited by examiner

SYSTEM, METHOD AND APPARATUS FOR TRANSPARENTLY GRANTING ACCESS TO A SELECTED DEVICE USING AN AUTOMATICALLY GENERATED CREDENTIAL

TECHNICAL FIELD

The present invention relates generally to the field of computer systems and, more particularly, to a computer security system and method.

BACKGROUND

Some computer systems, computer peripheral devices, and other types of computer resource devices comprise a self-managed authentication mechanism such that a security credential provided by a user to access the resource device is verified or authenticated by the resource device without relying on an external authentication service or entity. However, many users are either unaware that such an authentication system exists on the resource device or, if used, a generally "weak" security credential is provided by the user, thereby rendering the resource device susceptible to attack (i.e., a shorter, more familiar and, therefore, more easily compromised password). Security credentials having a more complex or longer character string, resulting in a stronger security credential, are increasingly difficult for the user to remember or to input.

SUMMARY

In accordance with one embodiment of the present invention, a computer security system comprises a self-managed device having an authentication system for controlling access to the self-managed device by a user. The system also comprises a security module adapted to authenticate an identity of the user and, in response to user authentication, automatically generate, transparently to the user, device credential data verifiable by the authentication system to enable user access to the self-managed device.

In accordance with another embodiment of the present invention, a computer security method comprises authenticating an identity of a user and automatically generating transparently to the user, in response to user authentication, device credential data verifiable by an authentication system of a self-managed device to enable user access to the self-managed device.

In accordance with yet another embodiment of the present invention, a computer security system comprises a security module executable by a processor and adapted to access credential data to verify an identity of a user. The system also comprises an activation/deactivation module accessible via a networked administration client. The activation/deactivation module is adapted to interface with the security module in response to a request by the administration client to activate, transparently to the user, an authentication system of a self-managed device to control user access to the self-managed device.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

The preferred embodiments of the present invention and the advantages thereof are best understood by referring to FIGS. 1-4 of the drawings, like numerals being used for like and corresponding parts of the various drawings.

Figure 1:
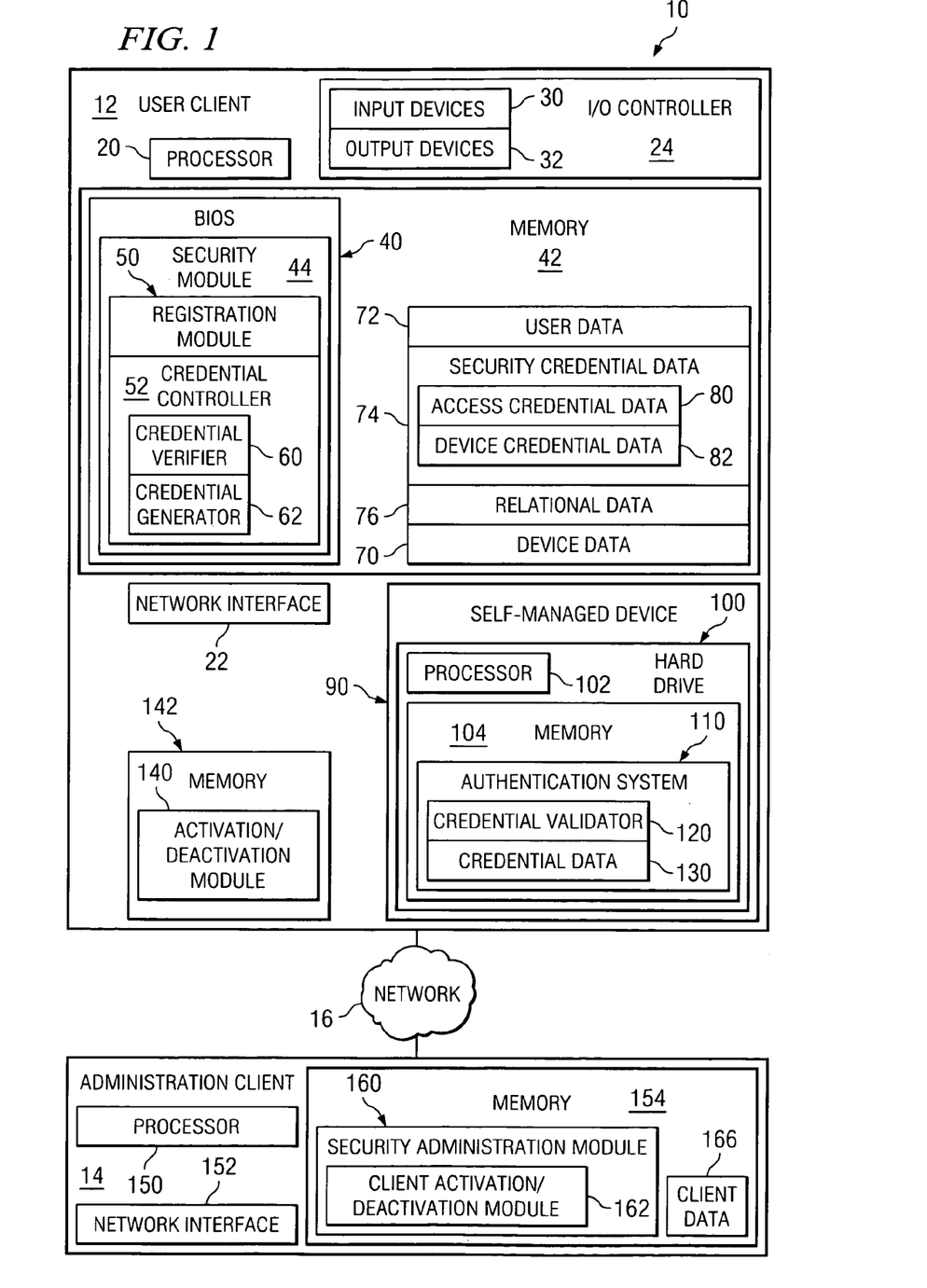
FIG. 1 is a diagram illustrating an embodiment of a computer security system in accordance with the present invention.

FIG. 1 is a diagram illustrating an embodiment of a computer security system 10 in accordance with the present invention. In the embodiment illustrated in FIG. 1, system 10 comprises a user client 12 coupled to an administration client 14 via a communications network 16. Communications network 16 may comprise any type of wired or wireless network now known or later developed. Briefly, system 10 provides for automatic activation and/or deactivation of an authentication system for a self-managed device such as, but not limited to, a hard drive, peripheral device, or other type of computer resource, by an administrator via administration client 14 or by a user of client 12. As used herein, a "self-managed device" comprises any type of computer resource or device adapted to authenticate security credentials for a user to access or initiate operations on the resource or device independent of an external computer resource. It should be understood that more than one self-managed device may reside on or form a part of a particular computer resource (e.g., a basic input/output system (BIOS) and hard drive of a desktop computer), a particular computer resource may itself comprise a self-managed device (e.g., a server), and a particular self-managed device may itself comprise a plurality of computer resources. In operation, system 10 automatically generates, transparently to the user, a security credential to be used by a corresponding self-managed device for access authentication. The security credential is transmitted, transparently to the user, to the self-managed device and stored by the self-managed device. Thus, for subsequent access requests to the self-managed device by a user, after verification of the identity of the user, a security credential is automatically transmitted to and authenticated by the self-managed device transparently to the user.

In the embodiment illustrated in FIG. 1, client 12 comprises a processor 20, a network interface 22, and an input/output (I/O) controller 24. Network interface 22 enables communications between user client 12 and administration client 14 via communication network 16. In FIG. 1, a single user client 12 is illustrated; however, it should be understood that additional user clients 12 may also be networked for system 10. I/O controller 24 enables control of various types of input device(s) 30 and output device(s) 32 for receiving information from a user of client 12 and outputting information to a user of client 12, respectively. Input device(s) 30 may comprise a keyboard, mouse, trackpad, modem, microphone, or any other type of device for inputting information to client 12. Output device(s) 32 may comprise a display monitor, speakers, a printer, or any other type of device for outputting information from client 12.

As illustrated in FIG. 1, system 10 also comprises a basic input/output system (BIOS) 40 stored in a memory 42 for performing booting or starting operations such as system initialization and tests and peripheral component registration operations. For example, upon booting or starting of client 12, processor 20 passes control to BIOS 40 to identify and ascertain the hardware and software resources connected to, or forming a part of, client 12. BIOS 40 also generally verifies that the connected hardware components are working properly and loads all or a portion of an operating system. All or a portion of BIOS 40 may be stored in various types of memory 42. For example, all or a portion of memory 42 may comprise read-only memory (ROM), erasable programmable read-only memory (EPROM), volatile or flash ROM, or other types of memory now known or later developed.

In the embodiment illustrated in FIG. 1, BIOS 40 also comprises a security module 44. Security module 44 may comprise hardware, software, or a combination of hardware and software. Briefly, security module 44 is used to verify or authenticate the identity of a user of client 12 and automatically activate and/or deactivate an authentication system of a self-managed device. Additionally, security module 44, transparently to the user, automatically generates and/or transmits a security credential to a corresponding self-managed device so that the corresponding self-managed device may use the generated and received security credential to verify subsequent access to the device by the user transparently to the user. In FIG. 1, security module 44 is illustrated as a component of BIOS 40; however, it should be understood that security module 44 may be otherwise stored, located and/or accessible on client 12 to accommodate a variety of self-managed device security applications.

In the embodiment illustrated in FIG. 1, security module 44 comprises a registration module 50 and a credential controller 52. Registration module 50 is used to identify self-managed devices coupled to client 12 or configured as a component of client 12 such that security module 44 may be used to activate and/or deactivate an authentication system of a particular self-managed device. For example, in operation, registration module 50 may perform a registration operation to identify and register each available self-managed device coupled to client 12 or configured as a component of client 12. The information obtained by registration module 50 may be stored in memory 42 as device data 70.

Credential controller 52 is used to verify or authenticate a security credential corresponding to a user of client 12 and/or automatically generate or transmit a security credential to a corresponding self-managed device for subsequent authentication operations performed by the self-managed device. For example, in the embodiment illustrated in FIG. 1, credential controller 52 comprises a credential verifier 60 and a credential generator 62. Credential verifier 60 is used to verify or authenticate an identity or other type of security information corresponding to a user of client 12. For example, as illustrated in FIG. 1, user data 72, security credential data 74, and relational data 76 are stored in memory 42 so as to be accessible by security module 44. User data 72 comprises information associated with each user of client 12 such as, but not limited to, the identity of the user, an Internet protocol (IP) address associated with client 12, or other type of information associated with either a user of client 12 or information associated with client 12. Thus, for example, user data 72 may comprise an alphanumeric character string indicating a username or other type of user identification information that a user inputs to client 12 and that is verifiable by credential verifier 60 based on user data 72.

Security credential data 74 comprises security information associated with accessing or initiating operations on a secure computer resource. For example, in the embodiment illustrated in FIG. 1, security credential data 74 comprises access credential data 80 and device credential data 82. Access credential data 80 comprises information associated with verifying or authenticating an identity of a user for accessing or initiating operations on a particular computer resource such as, but not limited to, client 12. For example, access credential 80 may be used by verifier 60 in association with user data 72 to verify the identity of a user. Thus, for example, to access or initiate operations on client 12, verifier 60 may access user data 72 and access credential data 80 to verify or authenticate a username and password input by the user to access client 12. In some embodiments, client 12 may also be configured for pre-boot authentication such that an access security credential 80, such as a password or other type of security credential, is provided by a user of client 12 for initiating a booting operation of client 12.

Device credential data 82 comprises information associated with security credentials for accessing or initiating operations of a self-managed device. For example, device credential data 82 comprises information used by a self-managed device to verify or authenticate access to a secure self-managed device. Relational data 76 comprises information associated with relating user data 72 to security credential data 74. For example, for each user of client 12, various types of security credentials may be stored in memory 42 corresponding to accessing or initiating operations on client 12 or accessing or initiating operations of self-managed device(s). Relational data 76 correlates access credential data 80 and/or device credential data 82 to user data 72. However, it should also be understood that information correlating or otherwise relating a particular user to credential data 74 associated with the particular user and/or device(s) 90 controlled via security module 44 for the particular user may be otherwise performed (e.g., populating fields of user data 72 with information identifying device(s) 90 secured via module 44 for the user and/or credential data 82 for each device secured using module 44 for the particular user).

Credential generator 62 automatically generates a security credential for authentication use by a corresponding self-managed device and/or transmits the generated security credential to the corresponding self-managed device transparently to the user. For example, in operation, credential verifier 60 receives an access credential data 80 from a user of client 12 and verifies or authenticates the access credential data 80 based on user data 72. During an initial enablement operation for an authentication system of a particular self-managed device, credential generator 62 automatically generates device credential data 82 for the corresponding self-managed device. For example, in some embodiments, credential generator 62 may randomly generate an alphanumeric character string or other type of security credential that will be used by the corresponding self-managed device for authentication operations. In some embodiments, credential generator 62 may generate the corresponding self-managed device security credential based on user data 72 and/or access credential data 80. For example, credential generator 62 may generate the corresponding self-managed device security credential by hashing user data 72 with access credential data 80. The security credential generated by credential generator 62 is stored in memory 42 as device credential data 82. Additionally, credential controller 52 correlates device credential data 82 generated by credential generator 62 with user data 72.

In the embodiment illustrated in FIG. 1, a self-managed device 90 resides on client 12. For example, in the illustrated embodiment, self-managed device 90 comprises a hard drive 100 having a processor 102 and a memory 104. As described briefly above, self-managed device 90 is configured to verify or authenticate a security credential without relying on an external authentication mechanism. For example, in the embodiment illustrated in FIG. 1, device 90 comprises an authentication system 110. Authentication system 110 may comprise hardware, software, or a combination of hardware and software. In the embodiment illustrated in FIG. 1, authentication system 110 comprises a credential validator 120. Briefly, credential validator 120 verifies or authenticates device credential data 82 received from security module 44 to authorize access or initiate operations of hard drive 100. Information associated with verifying or authenticating device credential data 82 may be stored as credential data 130 in memory 104.

In the embodiment illustrated in FIG. 1, client 12 also comprises an activation/deactivation module 140 stored in a memory 142. Activation/deactivation module 140 may comprise hardware, software, or a combination of hardware and software. Briefly, activation/deactivation module 140 is executable by processor 20 to provide an interface for a user of client 12 to activate and/or deactivate an authentication system of a particular self-managed device coupled to or forming a part of client 12. For example, in operation, a user of client 12 may desire to activate and/or deactivate an authentication system associated with a particular self-managed device. Activation/deactivation module 140 provides an interface to security module 44 such that the user of client 12 may select a desired self-managed device for authentication system activation or deactivation from a listing of registered self-managed devices presented or displayed to the user. In response to a selection by a user of a particular self-managed device, activation/deactivation module 140 automatically interfaces with security module 44 to initiates the corresponding activation or deactivation operation for the authentication system of the selected self-managed device.

Thus, in operation, during a booting or other operation of client 12, security module 44 may request and receive from a user of client 12 user data 72 and/or access credential data 80 to control access to client 12 and/or initiate a booting or other operation of client 12. Security module 44 may also perform a registration operation using registration module 50 to identify each self-managed device available for authentication system activation or deactivation.

To activate or deactivate an authentication system of a particular self-managed device, the user of client 12 may initiate or activate activation/deactivation module 140. Activation/deactivation module 140 interfaces with security module 44 to provide a listing or display of registered self-managed devices for authentication system activation or deactivation. Activation/deactivation module 140 receives a selection of a particular self-managed device for authentication system activation or deactivation and interfaces with security module 44 to perform the desired activation or deactivation operation. In some embodiments, security module 44 may also be configured to automatically activate and/or deactivate all or a portion of the registered self-managed devices during a booting or other operation, thereby enabling automatic authentication system control and policies to be implemented on any client 12.

To activate an authentication system for a particular self-managed device, credential controller 52 accesses user data 72 and/or access credential data 80 to verify or authenticate an identity of a particular user of client 12 using credential verifier 60. After user authentication, credential generator 62 automatically generates device credential data 82 for a desired self-managed device. For example, credential generator 62 may randomly generate a password or other type of security credential at a predetermined level of complexity or strength and transmit the generated device credential data 82 to a particular self-managed device such as, for example, self-managed device 90. Self-managed device 90 stores the device credential data 82 as credential data 130 in memory 104. Credential validator 120 uses the credential data 130 to verify or authenticate access to device 90 for subsequent operations. Credential controller 52 also correlates the generated device credential data 82 for each use of client 12 via relational data 76.

In some embodiments, client 12 may be configured to automatically authorize access to all or a portion of the registered self-managed devices during a booting or other operation of client 12 or may be configured to authorize access to particular self-managed devices as the user desires access to the particular self-managed device. For example, security module 44 may be configured to automatically transmit device credential data 82 to each corresponding self-managed device upon verification of user data 72 and/or access credential data 80. Thus, during a booting or other operation of client 12, security module 44, transparently to the user of client 12, transmits device credential data 82 to all or a portion of the registered self-managed devices such that the authentication system of each corresponding self-managed device may verify or authenticate the device credential data 82 for accessing or initiating operations using the corresponding self-managed device. Alternatively or additionally, security module 44 may be configured to transmit device credential data 82 to a particular self-managed device 90 in response to a request by a user of client 12 to access or initiate operations for a particular self-managed device 90. Thus, in this application, in response to a request or operational function initiated by a user of client 12, security module 44, transparently to the user, transmits device credential data 82 to a corresponding self-managed device for authentication by the self-managed device.

In the embodiment illustrated in FIG. 1, administration client 14 comprises a processor 150, a network interface 162, and a memory 154. Network interface 152 enables communications between administration client 14 and user client 12 via communication network 16. As illustrated in FIG. 1, administration client 14 also comprises a security administration module 160. Security administration module 160 may comprise software, hardware, or a combination of software and hardware. In FIG. 1, security administration module 160 is illustrated as being stored in memory 154 so as to be executable by processor 150. However, it should be understood that security administration module 160 may be otherwise stored, even remotely, so as to be accessible and executable by processor 150.

As illustrated in FIG. 1, security administration module 160 comprises a client activation/deactivation module 162 for interfacing with security module 44 of a particular user client 12 to activate or deactivate an authentication system 110 of a particular self-managed device 90. For example, administration client 14 comprises client data 166 stored in memory 154 having information associated with client 12 such as, but not limited to, available or registered self-managed devices 90 of client 12 having authentication systems 110 for activation or deactivation. Client data 166 may also comprise information associated with user data 72 and/or access credential data 80 such that a user of administration client 14 may provide proper security credentials for authentication by security module 44. User data 72 and/or access credential data 80 may also comprise information associated with verifying or authenticating access for administration personnel.

Thus, in operation, a user of administration client 14 may initiate client activation/deactivation module 162 to communicate with a particular client 12 via communication network 16 to activate or deactivate an authentication system 110 of a particular self-managed device 90. For example, in operation, client activation/deactivation module 162 may interface with security module 44 such that access credentials of administration client 14, or a user of administration client 14, may be verified by credential verifier 60. After security credential authentication, client activation/deactivation module 162 may be used to select a particular self-managed device 90 for authentication system 110 activation or deactivation. Based on a selection of a particular self-managed device 90 by a user of administration client 14, for authentication system 110 activation, security module 44 generates device credential data 82 via credential generator 62 and transmits the generated device credential data 82 to a corresponding self-managed device 90 such that device credential data 82 may be authenticated by authentication system 110 of the self-managed device 90 during subsequent operations. It should also be understood that system 10 may be configured to enable automatic and transparent activation of an authentication system 110 of a device 90 from within an operating system (O/S) runtime environment.

Deactivation of an authentication system 110 for all or particular self-managed device(s) 90 may be accomplished in a manner similar as described above. For example, administration client 14 may interface with security module 44 of a particular client 12 via security administration module 160 to deactivate an authentication system 110 for all or particular self-managed device(s) 90 of client 12. A user of client 12 may also access or initiate activation/deactivation module 140 to deactivate an authentication system 110 for all or particular self-managed device(s) 90.

Figure 2:
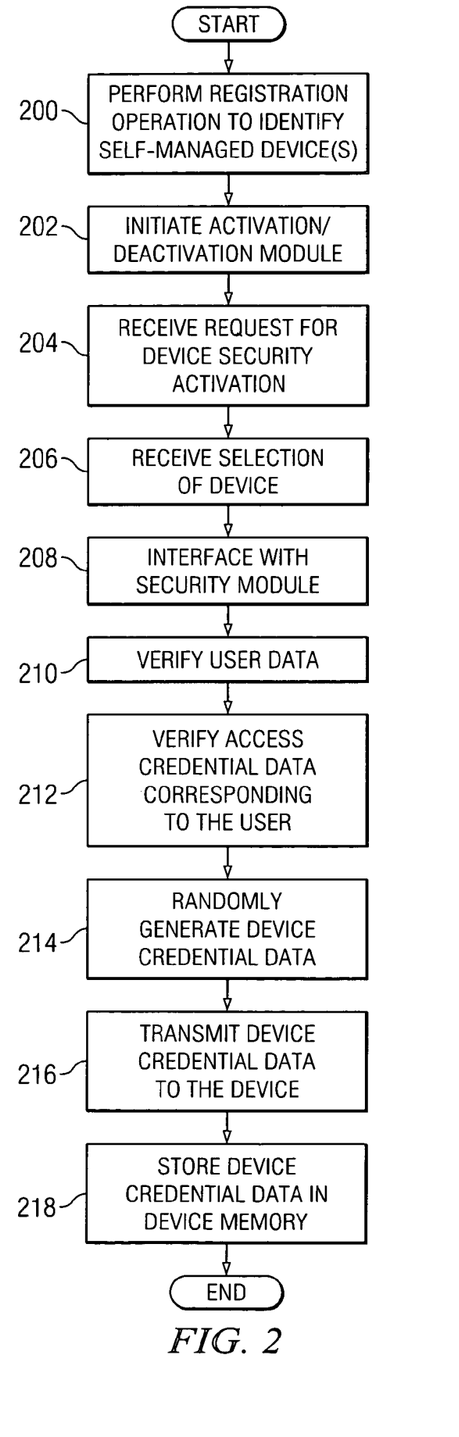
FIG. 2 is a flow chart illustrating an embodiment of a computer security method in accordance with the present invention.

FIG. 2 is a flowchart illustrating an embodiment of a computer security method in accordance with the present invention. The method begins at block 200, where registration module 50 of security module 44 performs a registration operation to identify and register self-managed device(s) 90 coupled to or configured as components of client 12. At block 202, client 12 initiates activation/deactivation module 140. For example, a user of client 12 may click on a desktop icon or perform some other function to launch or initiate activation/deactivation module 140. At block 204, activation/deactivation module 140 receives a request from a user of client 12 to activate an authentication system 110 for a particular self-managed device 90. At block 206, activation/deactivation module 140 receives a selection of a particular self-managed device 90 from the user. For example, as described above, activation/deactivation module 140 may present or display to the user a listing of registered self-managed devices 90 for authentication system 110 activation or deactivation.

At block 208, activation/deactivation module 140 interfaces with security module 44. At block 210, security module 44 verifies user data 72 received by a user of client 12 via credential verifier 60. At block 212, security module 44 verifies access credential data 80 received by a user of client 12 via credential verifier 60.

Upon verification of user data 72 and/or access credential data 80, credential generator 62 automatically generates device credential data 82, transparently to the user, for the desired self-managed device 90 at block 214. For example, as described above, credential generator 62 may randomly generate device credential data 82, transparently to the user, such that a generally complex or strong security credential may be used to control access to the desired self-managed device 90. At block 216, security module 44 transmits the device credential data 82 to the corresponding self-managed device 90. At block 218, the device credential data 82 is stored in memory 104 of the corresponding self-managed device 90 as credential data 130 to enable the self-managed device 90 to authenticate access to the device 90 for subsequent access operations.

Figure 3:
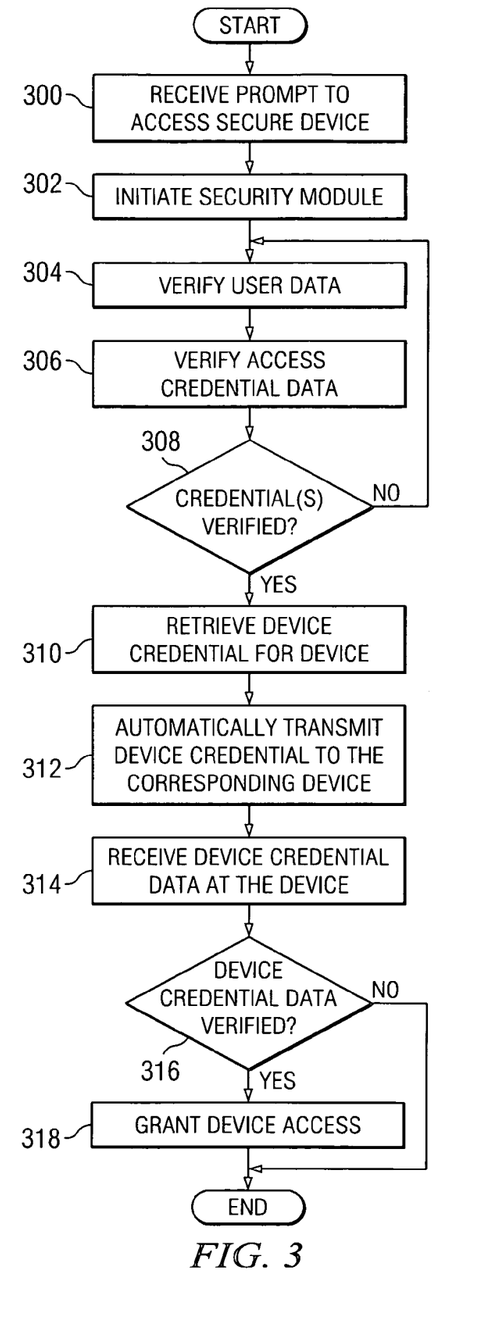
FIG. 3 is a flow chart illustrating another embodiment of a computer security method in accordance with the present invention.

FIG. 3 is a flowchart illustrating another embodiment of a computer security method in accordance with the present invention. The method begins at block 300, where client 12 receives a prompt or request from a user to access a secure self-managed device 90. At block 302, processor 20 initiates security module 44. At block 304, client 12 receives and/or verifies user data 72 associated with the user. At block 306, client 12 receives and/or verifies access credential data 80 associated with the user. For example, the user may input a username and password to client 12 to be verified by verifier 60 using user data 72 and/or access credential data 80 or, if a user is already logged into or performing operations on client 12, security module 44 may verify or authenticate previously received user data 72 and/or access credential data 80.

At decisional block 308, a determination is made whether user data 72 and/or access credential data 80 is verified for the particular user of client 12. For example, as described above, credential verifier 60 of security module 44 authenticates information received from a user of client 12 using user data 72 and/or access credential data 80. If the security credentials provided by the user of client 12 are not verified, the method returns to block 304. If the security information provided by the user is verified or authenticated by credential verifier 60, the method proceeds from block 308 to block 310, where security module 44 retrieves device credential data 82 for the corresponding self-managed device 90. Security module 44 may access relational data 76 to correlate device credential data 82 to a particular user and/or a particular self-managed device 90. At block 312, security module 44 automatically transmits device credential data 82 to the corresponding self-managed device 90 transparently to the user.

At block 314, device credential data 82 is received at the corresponding self-managed device 90. At the decisional block 316, a determination is made whether the received device credential data 82 is verified. For example, as described above, credential validator 120 may access credential data 130 and compare credential data 130 to the received device credential data 82. If the received credential data 82 is not verified, access to the self-managed device 90 is denied. If the received credential data 82 is verified or authenticated by authentication system 110, the method proceeds to block 318, where authentication system 110 grants device 90 access.

Thus, security module 44 interfaces with a corresponding self-managed device 90, transparently to the user, to authenticate access to the device 90. It should also be understood that security module 44 and/or authentication system 110 may use a variety of encryption/decryption methods to generate and/or authenticate device credential data 82.

Figure 4:
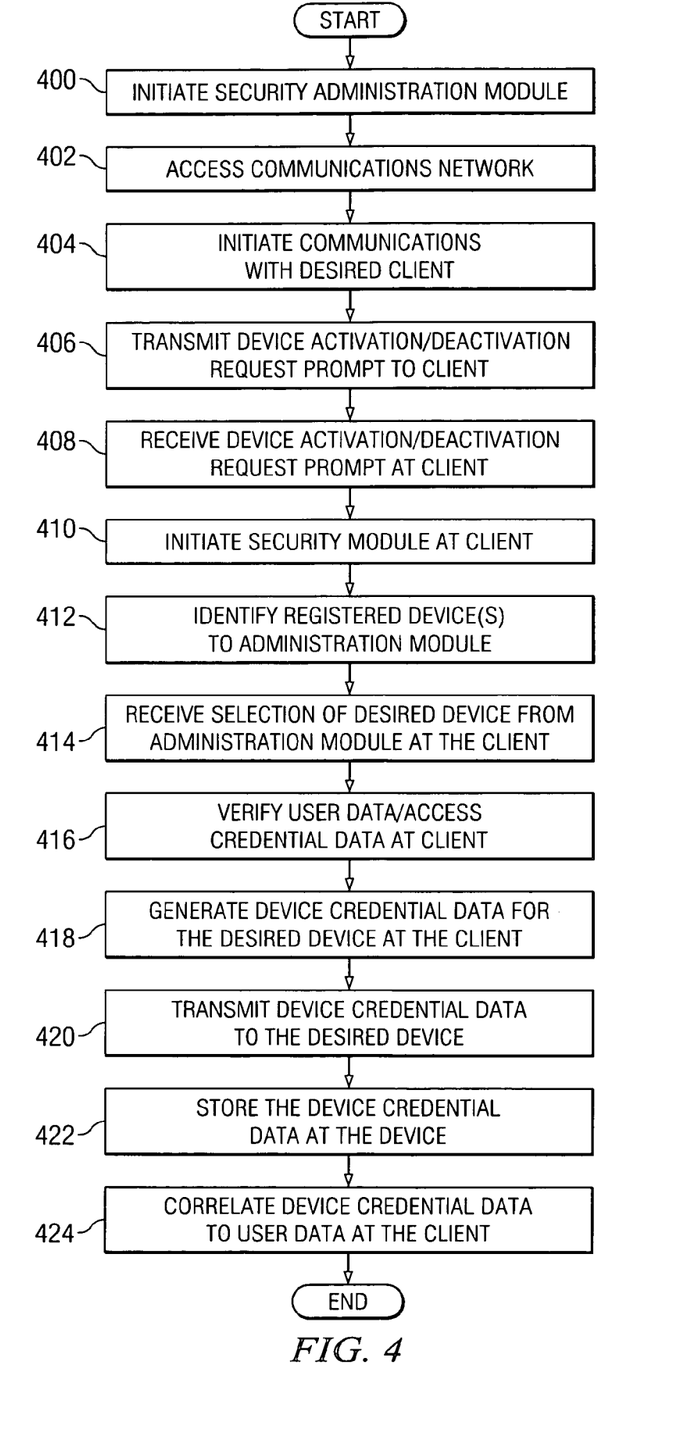
FIG. 4 is a flow chart illustrating yet another embodiment of a computer security method in accordance with the present invention.

FIG. 4 is a flowchart illustrating another embodiment of a computer security method in accordance with the present invention. The method begins at block 400, where processor 150 initiates security administration module 160. At block 402, network interface 152 accesses communications network 16. At block 404, security administration module 160 initiates communications with a desired client 12 via communications network 16.

At block 408, security module 44 of client 12 receives an activation or deactivation request from administration client 14 via client activation/deactivation module 162. At block 410, processor 20 initiates or activates security module 44 at client 12. At block 412, security module 44 identifies registered devices 90 available for activation or deactivation of a corresponding authentication system 110. For example, as described above, registration module 50 may be configured to display or provide a listing of registered devices 90 to administration client 14. At block 414, security module 44 receives a selection of a desired self-managed device 90 from administration module 14 via client activation/deactivation module 162. At block 416, security module 44 verifies user data 72 and/or access credential data 80 for the administration client 14 and/or user of administration client 14. At block 418, credential generator 62 automatically generates device credential data 82 for the desired self-managed device 90 transparently to the user. At block 420, security module 44 automatically transmits device credential data 82 to the corresponding self-managed device 90 transparently to the user. At block 422, the corresponding self-managed device 90 stores the device credential data 82 received from security module 44 as credential data 130 in memory 104. At block 424, security module 44 correlates device credential data 82 generated for a particular self-managed device 90 with corresponding user data 72 and/or access credential data 80.

Thus, embodiments of the present invention enable transparent generation and authentication of security credentials associated with self-managed devices 90, thereby enabling "strong" security credentials (e.g., relatively long and complex credential(s)) to be used for controlling access to the device 90. Additionally, in the embodiment illustrated in FIG. 1, security module 44 is illustrated as part of BIOS 40 such that portable devices 90 remain secure. For example, using a predetermined encryption/decryption technique, credential generator 62 may transmit encrypted device credential data 82 to device 90 such that credential validator 120 of device 90 decrypts the encrypted data 82 to authenticate access to device 90. However, it should be understood that security module 44 may also be otherwise stored on client 12 to enable a "logical" linking of security module 44 to portable devices 90 such that portable devices 90 remain secure.

Additionally, because device credential data 82 is generated and transmitted to device 90 transparently to the user, system 10 provides enhanced security for both online and offline applications. For example, for online applications, after user verification or authentication, relatively long and/or complex security credential(s) 82 are generated and transmitted to device(s) 90 transparently to the user, thereby eliminating or substantially reducing the likelihood that the security credential will be compromised by action of the user or by someone familiar with the user. In an offline application, if the self-managed device 90 is moved to another computer system, the self-managed device remains secure because security module 44 residing on the original computer system is "logically" linked to the self-managed device 90 because security module 44 transmits security credential 82 to the self-managed device 90 for authentication and verification. It should also be understood that system 10 may be configured to enable the user to detach or otherwise remove the "logical" binding between a particular self-managed device 90 and security module 44, thereby enabling use of the self-managed device 90 by another computer system.

It should be understood that in the methods described in FIGS. 2-4, certain functions may be omitted, combined, or accomplished in a sequence different than depicted in FIGS. 2-4. Also, it should be understood that the methods depicted in FIGS. 2-4 may be altered to encompass any of the other features or aspects described elsewhere in the specification.

What is claimed is:

1. A computer security system, comprising:
    at least one self-managed device having an authentication system for controlling access to the self-managed device by a user;
    an activation module to display a listing of one or more self-managed devices and to receive a selection of a selected self-managed device from the listing; and
    a security module adapted to authenticate an identity of the user and, in response to user authentication, automatically generate, transparently to the user, device credential data verifiable by the authentication system of the selected self-managed device to enable user access to the selected self-managed device.

2. The system of claim 1, wherein the security module is adapted to randomly generate the device credential data.

3. The system of claim 1, wherein the security module is adapted to automatically transmit, transparently to the user, the device credential data to the self-managed device.

4. The system of claim 1, wherein the security module is adapted to receive a request from a networked administration client to activate the authentication system of the self-managed device.

5. The system of claim 1, wherein the security module is disposed within a basic input/output system (BIOS).

6. The system of claim 1, wherein the security module is adapted to access relational data correlating the user to the device credential data for the self-managed device.

7. The system of claim 1, further comprising an activation/deactivation module accessible by an administration client to activate the authentication system of the self-managed device.

8. The system of claim 1, further comprising an activation/deactivation module accessible by an administration client to deactivate the authentication system of the self-managed device.

9. The system of claim 1, wherein the security module is adapted to receive a request from a networked administration client to deactivate the authentication system of the self-managed device.

10. The system of claim 1, wherein the security module is adapted to perform a registration operation to register the self-managed device.

11. A computer security system, comprising:
    means for controlling user access to a self-managed device;
    means for displaying a listing of one or more self-managed devices and for receiving a selection of a selected self-managed device from the listing; and
    means for authenticating an identity of the user and, in response to user authentication, automatically generating, transparently to the user, device credential data verifiable by the controlling means of the selected self-managed device to enable user access to the selected self-managed device.

12. The system of claim 11, further comprising means for automatically transmitting the device credential data, transparently to the user, to the self-managed device for verification by the controlling means.

13. The system of claim 11, further comprising means for correlating the device credential data with the user.

14. The system of claim 11, further comprising means for receiving a request from a networked administration client to activate the controlling means.

15. The system of claim 11, further comprising means for randomly generating the device credential data.

16. A computer security method, comprising:
   authenticating an identity of a user;
   displaying a listing of one or more self-managed devices that have an associated authentication system; and
   in response to receiving a selection of a selected self-managed device from the listing, automatically generating transparently to the user, in response to user authentication, device credential data verifiable by an authentication system of the selected self-managed device to enable user access to the selected self-managed device.

17. The method of claim 16, further comprising automatically transmitting, transparently to the user, the device credential data to the self-managed device.

18. The method of claim 16, further comprising randomly generating the device credential data.

19. The method of claim 16, further comprising receiving a request from a networked administration client to activate the authentication system of the self-managed device.

20. The method of claim 16, further comprising receiving a request from a networked administration client to deactivate the authentication system of the self-managed device.

21. The method of claim 16, further comprising initiating an activation/deactivation module to enable activation of the authentication system.

22. The method of claim 16, further comprising accessing relational data correlating the device credential data with the user.

23. The method of claim 16, further comprising storing the device credential data at the self-managed device.

24. The method of claim 16, further comprising performing a registration operation to register the self-managed device to the user.

25. A computer security system, comprising:
   a security module executable by a processor, the security module configured to access credential data to verify an identity of a user; and
   an activation/deactivation module accessible via a networked administration client, the activation/deactivation module configured interface with the security module to:
   display a listing of one or more self-managed devices that have an associated authentication system and to receive a selection of a selected self-managed device from the listing; and
   in response to a request by the administration client, to activate, transparently to the user, an authentication system of selected self-managed device to control user access to the selected self-managed device.

26. The system of claim 25, wherein the security module is adapted to automatically generate, transparently to the user, a device credential for verification by the authentication system.

27. The system of claim 25, wherein the security module is adapted to randomly generate, transparently to the user, a device credential for verification by the authentication system.

28. The system of claim 25, wherein the security module is adapted to transmit, transparently to the user, a device credential to the device for verification by the authentication system.

29. The system of claim 25, wherein the activation/deactivation module is adapted to display to the user registered self-managed devices available for authentication system deactivation.

30. The system of claim 25, wherein the security module is adapted to correlate a device credential for verification by the authentication system with the user.

31. A computer network security system, comprising:
   a security module configured to automatically generate, transparently to a user, device credential data verifiable by an authentication system of a selected self-managed device to enable user access to the selected self-managed device; and
   an activation/deactivation module configured to receive a request from the user to automatically activate the authentication system of the selected self-managed device including:
   displaying a listing of one or more self-managed devices that have an associated authentication system; and
   receiving a selection from the displayed listing where the selection represents the selected self-managed device.

32. The system of claim 31, wherein the security module is adapted to automatically transmit, transparently to the user, the device credential data to the authentication system.

33. The system of claim 31, wherein the self-managed device is adapted to store the device credential data received from the security module.

34. The system of claim 31, wherein the security module is disposed within a basic input/output system (BIOS).

35. The system of claim 31, wherein the activation/deactivation module is adapted to receive a request from a networked administration client to activate the authentication system.

36. The system of claim 31, wherein the security module is adapted to randomly generate the device credential.

37. A computer security method, comprising:
   authenticating an identity of a user;
   displaying a listing of one or more self-managed devices that have an associated authentication system;
   receiving a selection from the displayed listing where the selection represents the selected self-managed device; and
   if the identity successfully authenticated, generating and transmitting, transparently to the user, device credential data to the self-managed device for authentication by the selected self-managed device to enable the user to access the selected self-managed device.

38. The method of claim 37, further comprising correlating the identity of the user to the device credential data.

39. The method of claim 37, further comprising performing a registration operation to register the self-managed device.

40. The method of claim 37, further comprising encrypting the device credential data.

41. The method of claim 37, wherein transmitting comprises transmitting, transparently to the user, encrypted device credential data to the self-managed device for decryption by the self-managed device to authenticate access to the self-managed device.

42. An electronic device, comprising:
   a self-managed device disposed within the electronic device and configured to manage user access to the self-managed device;
   an activation module to display a listing of one or more self-managed devices that include an associated authentication system, and to receive a selection of a selected self-managed device from the listing; and
   a security module disposed within a basic input/output system (BIOS) of the electronic device and, in response to user authentication, configured to automatically generate, transparently to the user, device credential data verifiable by an authentication system of the selected self-managed device.

43. The electronic device of claim 42, wherein the security module is configured to randomly generate the device credential data.

44. The electronic device of claim 42, wherein the security module is configured to receive a request from a networked administration client to activate the authentication system of the self-managed device.

45. The electronic device of claim 42, further comprising an activation/deactivation module accessible by an administration client to activate the authentication system of the self-managed device.

46. The electronic device of claim 42, wherein the security module is configured to receive a request from a network administration client to deactivate the authentication system of the self-managed device.

* * * * *

UNITED STATES PATENT AND TRADEMARK OFFICE
CERTIFICATE OF CORRECTION

PATENT NO. : 7,581,111 B2 Page 1 of 1
APPLICATION NO. : 10/780397
DATED : August 25, 2009
INVENTOR(S) : Matthew J. Wagner et al.

It is certified that error appears in the above-identified patent and that said Letters Patent is hereby corrected as shown below:

In column 11, line 41, in Claim 25, after "configured" insert -- to --.

In column 11, line 50, in Claim 25, before "selected" insert -- the --.

Signed and Sealed this

Thirteenth Day of April, 2010

David J. Kappos
*Director of the United States Patent and Trademark Office*